Nov. 6, 1962  E. O. KALIL  3,061,912

FABRICATION OF POROUS SHEET MATERIAL BY BRAZING

Filed April 4, 1957

INVENTOR.
EMIL O. KALIL
BY Victor D. Behn
ATTORNEY

Patented Nov. 6, 1962

3,061,912
FABRICATION OF POROUS SHEET MATERIAL
BY BRAZING
Emil O. Kalil, Brooklyn, N.Y., assignor to Curtiss-Wright Corporation, a corporation of Delaware
Filed Apr. 4, 1957, Ser. No. 650,619
1 Claim. (Cl. 29—163.5)

This invention relates to porous sheet-like material and to a method of fabricating such material.

An object of the invention comprises the provision of porous sheet-like material of novel construction and to a novel method of fabricating sheet-like material of uniform porosity from a plurality of layers of wire cloth.

A further object of the invention comprises the provision of a novel method of fabricating such porous material by brazing a plurality of layers of wire cloth together to form an integral strip of sheet-like porous material of substantial strength and rigidity as compared to that of a single layer of the wire cloth.

Other objects of the invention will become apparent upon reading the annexed detailed description in connection with the drawing in which.

Figure 2:
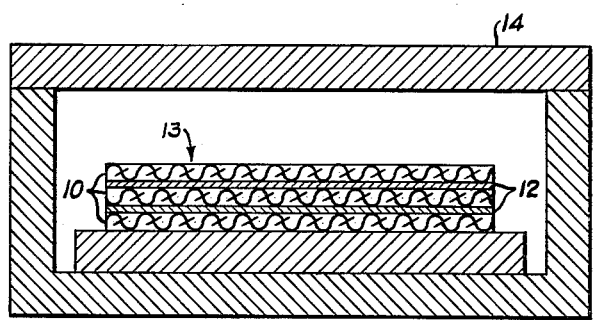
FIG. 2 is a schematic view of a plurality of layers of wire cloth about to be brazed together in a furnace; in accordance with the invention.

Referring to the drawing, reference numeral 10 designates a sheet or layer of wire cloth. A plurality of layers of such wire cloth 10 are superimposed with a thin uniform layer 12 of a suitable brazing metal interposed between each pair of adjacent wire cloth layers 10 to provide a composite multi-layer structure 13.

In general, the layers of wire cloth are disposed with the directions of their corresponding weave wires rotatively displaced relative to each other to provide the desired distribution of the strength of the finished sheet product in different directions. If substantially uniform strength of the finished sheet product is desired in all directions in the plane of its sheet, then with three layers of wire cloth as illustrated said layers preferably would have the directions of their corresponding weave wires displaced 120° relative to each other. Such an arrangement would minimize any anisotropy in the mechanical properties of the finished product. Other arrangements of the relative orientation of the several layers may be used depending on the desired properties of the finished product. For example, with three layers of wire cloth, the two outside layers could have the direction of their corresponding weave wires disposed parallel while the intermediate layer could have the direction of its corresponding weave wires disposed at right angles to that of the other layers. If, however, most of the strength in the finished sheet product is desired in one direction, then the corresponding weave wires of the individual layers would all be disposed parallel so as to provide the maximum strength in the desired direction.

Figures 1, 3:
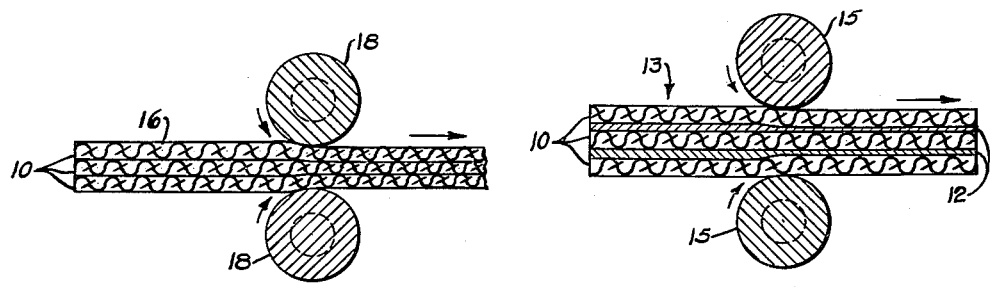
FIG. 1 is a schematic view of a preliminary step in the fabrication process of the invention.
FIG. 3 is a schematic view of a subsequent rolling operation.

Preferably, the composite structure 13 is cold rolled between rolls 15, as illustrated in FIG. 1, so as to squeeze some of the relatively soft brazing metal into the openings or pores of the wire cloth layers. This facilitates the spread and distribution of the brazing metal around wires of the wire cloth layers during the subsequent brazing operation.

The wire cloth layers 10 of the composite structure 13 are then brazed together for example by placing said composite structure in a brazing furnace 14, FIG. 2. The temperature within the brazing furnace is sufficient to melt the brazing metal 12 to braze the layers 10 together. The furnace 14 may be a batch-type furnace as schematically illustrated or the plurality of alternate layers of wire cloth and brazing metal could be passed through a furnace in a continuous brazing process.

The temperature of the brazing furnace need not be much higher than that required to melt the braze metal 12. In the brazing operation, the brazing metal melts and adheres to the individual wires of the wire cloth layers 10 to bond adjacent wires together thereby forming an integral sheet-like structure 16. The amount of braze metal used is not sufficient to close the openings in the wire cloth so that the integral sheet-like structure 16 is porous. The size of the openings or pores in the structure 16 can be varied by varying the amount of brazing metal.

The structure 16 is mechanically strong and rigid compared to the corresponding properties of the individual layers of wire cloth. The number of layers of wire cloth 12 not only determines the strength of the brazed structure 16 but also determines its permeability. Thus the permeability of the structure 16 can be decreased by increasing the number of layers of a given type of wire cloth 12 making up said structure. Also, by itself an individual layer of wire cloth 10 has definite directional characteristics with respect to its mechanical properties. As previously stated, by disposing the superimposed layers of wire cloth 10 so that the directions of their corresponding weave wires are rotatively displaced relative to each other any such anisotropy in the structure 16 is minimized.

The permeability of the brazed sheet-like structure 16 can be reduced to a predetermined extent by reducing the thickness of said structure for example by cold rolling said structure. Such a fabrication step is schematically illustrated in FIG. 3.

In FIG. 3 the sheet structure 16 is passed between a pair of rolls 18 to reduce its thickness as illustrated. The reduction in thickness of the sheet-like structure 16 is obtained by a flattening of its individual wires thereby decreasing the size of the openings or pores in each of its layers so as to reduce the permeability of the brazed sheet-like structure 16. The rolls 18 are spaced apart to produce a reduction in thickness of the sheet-like structure 16 determined by the decrease in permeability desired. Obviously the reduction in thickness of the sheet structure 16 to reduce its permeability may be obtained by metal working operations other than cold rolling, for example by a coining operation.

The process described is particularly suited to production methods. Large sheets may be fabricated particularly if a continuous brazing process is used. The particular composition of the material of the wire cloth 10 and of the brazing metal 12 depends on the end use to which the brazed sheet structure 16 is to be put. Thus the wire cloth 10 may be made of stainless steel wire if corrosion resistant properties are desired. In addition, an inexpensive wire cloth may be used in which case, after the brazing operation the integral sheet structure 16 may be plated with a corrosion resistant or other protective coating. The mesh and type of weave of the wire cloth used also depends on the end use. For example, stainless steel wire cloth having a mesh of 30 by 150 openings per square inch has been used. Hence the number of layers of wire cloth, the mesh size of the individual wire cloth layers, the composition of the wire material and the thickness of the finished product are all chosen to provide a finished product having desired properties.

The brazed sheet-like structure 16 is mechanically strong and rigid compared to the corresponding properties of the individual layers of wire cloth. By itself, an individual layer of wire cloth has definite directional characteristics with respect to its mechanical properties. By disposing the superimposed layers of wire cloth so that, as previously stated, the directions of their corresponding weave wires are rotatively displaced relative to each other, any such anisotropy in the finished sheet structure is minimized.

Porous sheet materials fabricated with the process described have many uses in gas turbine and other jet engines because of the permeability, strength and corrosion resistant properties obtainable in such material with this process. Porous sheet material made by the process described may be used as liners for combustion chambers, for the wall structure of transpiration cooled turbine blades and many other uses.

As described, the braze metal 12 is uniformly distributed between the wire cloth layers 10 whereby the resulting brazed structure 10 has a uniform permeability. The permeability can be varied however by varying the distribution of the brazing metal 12 between the layers. For example, a permeability gradient varying from high permeability at one end to low permeability at the other end can be provided by using brazing metal sheets of progressively varying thickness between the wire cloth layers. Such a modification is illustrated in FIG. 4 and for ease of understanding the parts of FIG. 4 corresponding to the parts of FIG. 1 have been designated by the same reference numerals as said corresponding parts of FIG. 1 but with a subscript $a$ added thereto.

Figure 4:
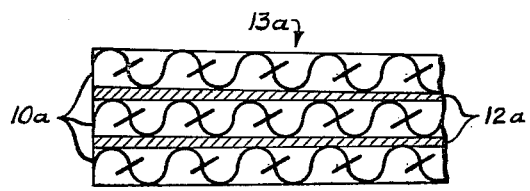
FIG. 4 is a magnified partial view similar to FIG. 1 but illustrating a modified arrangement.

In FIG. 4, a plurality of layers of wire cloth 10$a$ are superimposed with a layer of brazing metal 12$a$ disposed between each pair of adjacent layers 10$a$ to provide a multi-layer composite structure. As illustrated the layers of brazing metal 12$a$ are of progressively changing or tapering thickness. With this arrangement of FIG. 4, when the wire cloth layers 10$a$ are brazed together the permeability of the finished brazed structure will be a minimum at the end where the thickness of the brazing metal layer 12$a$ was a maximum and said permeability will progressively increase toward the other end of said structure.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

The method of fabricating a porous sheet-like structure from a plurality of layers of metallic wire cloth; said method comprising the steps of superimposing a plurality of similar layers of such wire cloth with the weave directions of adjacent layers rotatively displaced relative to each other and with a sheet of non-uniform thickness of brazing metal disposed between each pair of adjacent layers; pressing said superimposed layers of wire cloth and brazing metal together to force some of the brazing metal into the pores of the adjacent wire cloth layers; then brazing said layers together to form an integral sheet-like porous structure; and thereafter cold rolling said brazed sheet-like structure to reduce its thickness by flattening the wires of its layers thereby reducing the porosity of said structure, said non-uniform thickness of each sheet of brazing metal resulting in said structure having a non-uniform porosity such that a lesser porosity is obtained in those regions in which the thickness of the brazing sheets is a maximum.

References Cited in the file of this patent

UNITED STATES PATENTS

| | | |
|---|---|---|
| 629,395 | Sargent | July 25, 1899 |
| 1,102,685 | Proper | July 7, 1914 |
| 1,304,918 | Sweetland | May 27, 1919 |
| 2,061,850 | Roberts | Nov. 24, 1936 |
| 2,082,513 | Roberts | June 1, 1937 |
| 2,327,184 | Goodloe | Aug. 17, 1943 |
| 2,423,547 | Behlen | July 8, 1947 |
| 2,694,852 | Rogers | Nov. 23, 1954 |
| 2,820,985 | Cresswell | Jan. 28, 1958 |

FOREIGN PATENTS

| | | |
|---|---|---|
| 9,228 | Great Britain | 1911 |